June 20, 1967 F. W. SENFT 3,326,253
SAW AND HANDLE THEREFOR
Filed Dec. 30, 1965
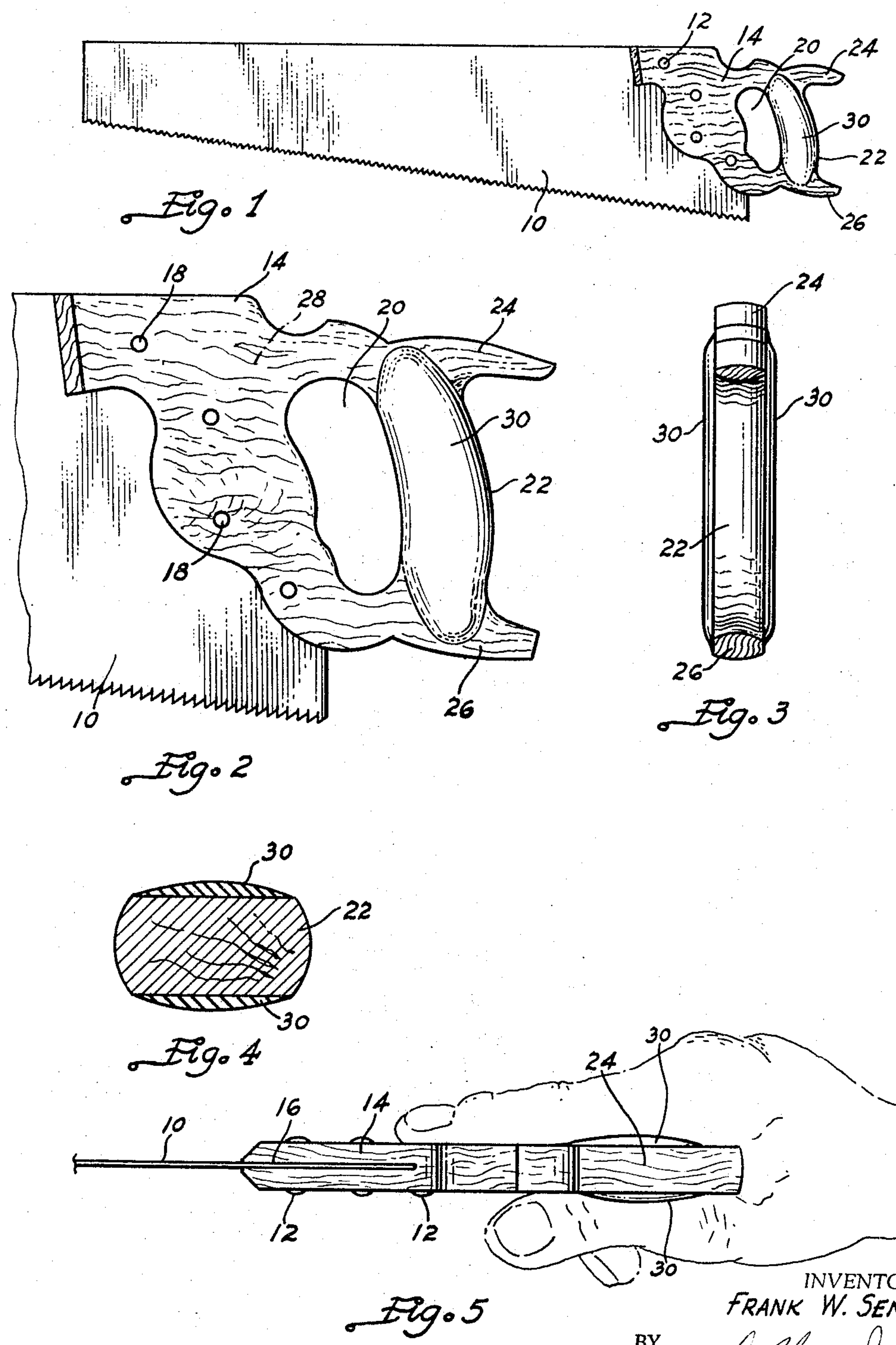
INVENTOR.
FRANK W. SENFT
BY
ATTORNEY United States Patent Office 3,326,253
Patented June 20, 1967

3,326,253
SAW AND HANDLE THEREFOR

Frank W. Senft, York, Pa., assignor to Pennsylvania Saw Corporation, York Pa., a corporation of Pennsylvania Filed Dec. 30, 1965, Ser. No. 517,750
4 Claims. (Cl. 145—31)

This invention pertains to a hand saw and handle therefor, and, more particularly, to improvements in the handle structure. In general, the saws to which the present invention pertains are known as carpenter saws which conventionally have been made for many years from wood. Usually, hardwood is preferred, of which maple and birth are two preferred types, although other suitable hardwoods are sometimes employed.

Hardwoods of the type normally employed for the manufacturing of saw handles are becoming increasingly more expensive and suitable supplies thereof are becoming steadily more difficult to obtain. This problems also is aggravated by the fact that, for many years, wooden handles for carpenter saws have had a thickness of 1" in finished condition. In the lumbering industry, wood is priced by the inch in thickness, in rough condition, whereby it is necessary to purchase lumber of approximately at least 1¼" thick, in rough condition, so that when planed to finished thickness, the lumber from which the saw handle blanks are cut is a minimum of 1" thick. However, while the finished saw handle is 1" thick, the cost of the lumber from which the blank was cut is twice that of a 1" thick board in rough condition, as distinguished from finished condition.

It is apparent, therefore, that carpenters have for many years been accustomed to gripping a saw handle which is 1" thick. Further, saw handles are not unusually subjected to hard use and accidental dropping, whereby the finished thickness of a minimum of 1" serves to prevent what otherwise might result in breaking and cracking of saw handles, especially considering the fact that the grain of saw handles conventionally extends longitudinally thereof, in the same direction as the blade extends from the handle in a finished saw, whereby it is apparent that in the grip portion of the saw handle which is encircled by the fingers and thumb of the user has a grain extending transversely to the length thereof, thus producing a condition which is reasonably subject to breakage when a saw handle is dropped, especially in certain ways. Heretofore, there has not been any customary manner of reinforcing particularly the grip portions of conventional wooden saw handles.

It is apparent from the foregoing facts that if stock lumber of a rough thickness of 1" maximum could be used to form saw handle blanks, substantially half the present cost of the stock lumber now used in making saw handle blanks having a finished thickness of 1" could be saved in the total manufacturing costs. This would mean, however, that when a 1" thick board in rough condition is planed to provide smooth and finished opposite surfaces, the finished thickness is approximately ¾". Thinning a wooden saw handle in this manner has at least one attribute in that the thickness of the handle is not so accented in appearance with respect to the relatively thin saw blade to which it is connected, especially in comparison with a saw handle having a finished thickness of 1". Attempts to minimize the appearance of this abrupt change in thickness from that of the saw handle to that of the blade have been made heretofore, such as beveling or rounding the forward end surface of the wooden saw handle so as to somewhat blend it into the thinness of the saw blade. Nevertheless, when viewed from the edge, a 1" thick saw handle appears to be extremely thick and bulky in comparison with respect to the thin blade to which it is attached, but such thinning weakens the handle.

It is the principal object of the present invention to provide a hand saw and handle in which the handle in particular is formed in finished condition from rough lumber stock not in excess of 1" in thickness, whereby the finished wooden handle is approximately ¾" thick, thus effecting a substantial saving in the cost of the raw material from which the handle is formed, as well as improving the esthetics of the saw with respect to the relative thicknesses of the blade and handle when viewed from the edge, yet the customary thickness of the hand grip portion of the handle is provided by attaching preferably to opposite sides of the hand grip portion auxiliary grip members which are coextensive in length with the hand grip of the handle so as to provide a finished thickness in the hand grip portion preferably equal to that of conventional wooden saw handles which are 1" thick in finished condition.

It is another object of the invention to provide the aforementioned auxiliary grip members which are suitably rounded at the edges and ends so as to blend the same into the configuration of the hand grip portion of the handle and additionally reinforce said hand grip portion by extending transversely to the grain of the hand grip portion and thereby minimize the possibility of damage to the handle if accidentally dropped, for example.

It is a further object of the invention to preferably form the aforementioned auxiliary grip members from rubber-like material, thereby providing a comfortable feel to the hand grip portion of the handle as well as afford a reasonable amount of friction and thereby minimize the possibility of slippage of the handle in the hand of the user, thus assuring greater accuracy during use of the saw to which such handle is attached.

Still another object of the invention which flows from the fact that the auxiliary grip members are preferably formed from rubber-like material resides in the fact that the resilience afforded thereby results in a cushioning of any blows sustained by the handle accidentally or otherwise, especially if the saw happens to fall in substantially flat condition upon a hard surface.

Details of the foregoing objects and of the invention are set forth in the following specification and illustrated in the accompanying drawing comprising a part thereof.

In the drawing:

FIG. 1 is a side view of an exemplary carpenter-type hand saw and handle embodying the principles of the present invention.

FIG. 2 is a fragmentary portion of the rear end of a conventional carpenter saw blade having a handle attached thereto which embodies the principles of the present invention, said handle being illustrated on a substantially larger scale than employed in FIG. 1.

FIG. 3 is a rear end view of the handle of the saw shown in FIG. 2 to afford a concept of the relative thicknesses of the saw handle per se and the auxiliary grip members attached to opposite sides of the hand grip portion of the handle.

FIG. 4 is a transverse sectional view through the hand grip portion of the saw handle shown in FIGS. 2 and 3, but illustrated on a larger scale than employed in FIGS. 2 and 3.

FIG. 5 is a top plan view of the fragmentary saw blade and handle attached thereto as viewed from the top of FIG. 2, the engagement of the handle by a human hand being exemplified in this figure.

In accordance with the principles of the present invention, and referring to FIGS. 1, 2 and 5 in particular, a conventional carpenter saw blade 10 is illustrated, the same having appropriate holes drilled through the rear end thereof for purposes of receiving suitable, preferably appropriate nuts and bolts 12, see FIG. 5, which usually are partially recessed into the opposite side surfaces of the handle 14 for purposes of connecting the blade 10 to the handle 14. The handle 14 is provided with an appropriate slot 16 complementary to the thickness of the blade 10 so as to snugly receive the rear end of the blade therein and permit the nuts and bolts 12 to effect a secure connection of the blade to the handle in accordance with customary practice. Conventional arrangement of the holes 18 in the handle 14, and correspondingly in the rear end of the saw blade, for the reception of the nuts and bolts 12, is shown in exemplary manner in FIG. 2. It also is to be understood that the exact shape of the handle shown particularly in FIGS. 1 and 2, as well as that of the blade shown in FIGS. 1 and 2 is not to be regarded as restrictive since the principles of the invention may be applied to a wide range of hand saws, particularly the type having a transversely extending opening 20 therein for the reception of fingers of the hand of the user which holds the saw handle, the opening 20 being somewhat slot-like and defining a preferably slightly curved hand grip member or portion 22, the opposite ends of which are integral with the upper and lower rearward extensions 24 and 26 of the handle.

As illustrated best in FIG. 2, it will be seen that the exemplary lines 28 which represent the general direction of the grain of the wood from which the handle 14 is formed extend longitudinally thereof, substantially in the direction of the longitudinal axis of the blade 10. This provides substantial strength for the upper and lower rearward extensions 24 and 26 of the handle, but such grain extends transversely to the longitudinal axis of the hand grip portion 22. It also will be seen from FIGS. 2 and 4 in particular that the hand grip portion has a relatively narrow dimension with respect to the longitudinal axis of the handle, as compared with the length of the hand grip portion 22. Thus, such hand grip portion is vulnerable to cracking and breaking primarily because of this condition. As a result, it has been customary to form wooden saw handles such as heretofore used from wood which has a minimum thickness of 1″ in finished condition, thereby providing a reasonably stocky type of hand grip portion 22 capable of resisting a limited amount of abuse without breaking and also providing a means which can be firmly gripped by the hand of the user for not only manipulating the saw but also positioning the same accurately, as desired, with respect to a workpiece.

In accordance with the principles of the present invention, however, it is possible to form the handle 14 from wood stock which, for example, may be 1″ or slightly less in thickness in the rough condition, whereby upon planing the opposite side surfaces to finish the wood stock, the resulting thickness may be substantially of the order of about ¾″ thick. The illustration in the attached drawing is based upon this approximate thickness. Normally, however, to reduce the thickness of the hand grip portion 22 to this extent would rather substantially reduce the overall strength thereof, and especially in regard to rendering it capable of withstanding normal hard use and incidental dropping, without splitting or breaking particularly the hand grip portion 22. Further, this reduced thickness in the hand grip portion 22 would result in a normal, experienced carpenter not having the accustomed amount of gripping bulk in his hand as he is accustomed to from a saw handle of conventional thickness, notwithstanding the fact that substantial savings in raw material can be effected. Such reduction in the thickness of the saw handle 14, however, is not only used to advantage in the present invention with respect to reducing the cost of the raw material from which the saw handle blanks are formed, but also results in other advantages accruing from providing auxiliary grip members 30 which, in accordance with the preferred construction, are formed from a suitable rubber-like composition and are securely attached to opposite sides of the wooden hand grip portion 22, by appropriate cement or the like.

In the preferred shape and construction of the auxiliary grip members 30, it will be seen that the same are substantially coextensive in length at least with the hand grip portion 22 of the wooden handle 14 and preferably overlap at least portions of the upper and lower rearward extensions 24 and 26 of the handle 14, as clearly shown in FIG. 2. The stock, for example, from which the auxiliary grip members 30 are formed preferably has a limited amount of compressibility, yet has sufficient body and rigidity to provide very effective and substantial reinforcing of the hand grip portion 22, especially to enable it to withstand accidental shock, such as that sustained by the handle in the event the saw is dropped upon a surface or object, particularly if the hand grip portion 22 strikes first, more or less in a flat condition, against the surface or object. One highly suitable type of raw material from which the auxiliary grip members 30 may be formed is that having a similar consistency to the rubber-like material from which automobile innertubes for pneumatic tires are formed. Certain types of belting of similar consistency also are formed from raw material of this suitable type.

In the preferred construction of the auxiliary grip members 30, they may be suitably molded, such as in a gang mold, in pairs respectively complementary to the opposite surfaces of the slightly curved hand grip portion 22, whereby, when the grip members of each pair are respectively cemented to opposite sides of the hand grip portion 22, they result in a composite handle of at least the same thickness as conventional wooden saw handles having a finished thickness of approximately 1″, notwithstanding the fact that the actual thickness of the wood in the handle 14 comprising the present invention is only approximately ¾″ thick. Hence, it is preferred that the auxiliary grip members 30 have a combined thickness of at least substantially ⅓ the thickness of the wooden handle 14, and particularly the thickness of the hand grip portion 22 thereof, as where it is desired to form the handle 14 from 1″ thick rough stock which is planed to a ¾″ finished thickness. Under such circumstances, each auxiliary grip member will be approximately ⅛″ thick. The sides and ends also preferably are beveled or rounded, as exemplified in FIGS. 2–4 in particular so as to blend into the curved fore and aft surfaces of the hand grip portion 22, as well as the side surfaces of the upper and lower rearward extensions 24 and 26.

In addition to reinforcing the hand grip portion 22 of the handle, the auxiliary grip members 30 provide a highly desirable and comfortable "feel" when gripped by the hand of the user, lending not only comfort to the hand and thereby minimizing fatigue resulting from extended periods of use, but, in addition, the preferred material also offers a substantial degree of friction so as to minimize the possibility of slipping of the handle within the hand of the user during operation of the saw, thereby affording maximum accuracy in use.

From the foregoing, it will be seen that the present invention provides a relatively simple, yet highly effective, improvement in the manufacturing costs, strength, and comfort in use of wooden saw handles applied to hand saws of the so-called carpenter-type through the simple expedient of permitting the use of a less expensive thickness of lumber from which the blanks are formed for making the wooden saw handles 14 and the application of comfort-inducing, as well as strength-imparting compressible auxiliary grip members 30 which are applied firmly by cement or the like to opposite surfaces of the hand grip portion 22, the auxiliary grip members 30 preferably being complementary in shape to said opposite surfaces to which they are affixed, thereby affording highly esthetic advantages in addition to the mechanical advantages referred to above.

While the invention has ben described and illustrated in its several preferred embodiments, it should be understood that the invention is not to be limited to the precise details herein described and illustrated since the same may be carried out in other ways falling within the scope of the invention as claimed.

I claim:

1. A hand saw and handle comprising a saw blade, a handle having a slot parallel to the outer side surfaces thereof and extending in from one end to receive one end of said blade, and means connecting said blade to said handle within said slot, said handle being substantially of uniform thickness and formed from wood having the grain extending longitudinally thereof generally in the direction of the saw blade, said handle also having an elongated opening extending substantially transversely to the longitudinal axis of the handle and generally parallel to the rear end thereof to form a hand grip integral at the opposite ends with the upper and lower portions of the handle in which the grain extends longitudinally, and auxiliary elongated grip members of resilient material fixed to opposite sides of said hand grip and extending longitudinally thereof to reinforce said grip and render it thicker than the handle, whereby said handle may be made from wood thinner than that which is required to form a hand grip of normal thickness equal to that of the entire saw handle.

2. The saw and handle according to claim 1 in which said resilient material is of limited compressibility to afford gripping comfort to the user.

3. The saw and handle according to claim 2 in which said auxiliary grip members are formed from rubber-like material, thereby to provide limited frictional gripping by the user and prevent undesired slipping.

4. The saw and handle according to claim 1 in which said auxiliary grip members are substantially coextensive in length with said hand grip and the combined thicknesses of said grip members is substantially no less than ⅓ the thickness of said hand grip.

References Cited

UNITED STATES PATENTS

| | | | |
|---|---|---|---|
| D. 122,704 | 9/1940 | Wickbergh. | |
| D. 153,407 | 4/1949 | Weaver. | |
| 1,296,416 | 3/1919 | Maddox | 145—29 X |
| 1,598,279 | 8/1926 | Hobbs | 145—29 X |
| 2,389,882 | 11/1945 | Wood | 30—340 |

WILLIAM FELDMAN, *Primary Examiner.*

R. V. PARKER, Jr., *Assistant Examiner.*